(12) United States Patent
Voigt et al.

(10) Patent No.: US 10,046,485 B2
(45) Date of Patent: Aug. 14, 2018

(54) METHOD FOR SIMULTANEOUS PRODUCTION OF A PLURALITY OF LEAF SPRINGS FROM A FIBER COMPOSITE MATERIAL

(71) Applicant: IFC Composite GmbH, Haldensleben (DE)

(72) Inventors: Matthias Voigt, Hohe Boerde OT Brumby (DE); Rudiger Trojahn, Berlin (DE); Heiko Kempe, Magdeburg (DE)

(73) Assignee: IFC Composite GmbH, Haldensleben (DE)

( * ) Notice: Subject to any disclaimer, the term of this patent is extended or adjusted under 35 U.S.C. 154(b) by 535 days.

(21) Appl. No.: 14/627,200

(22) Filed: Feb. 20, 2015

(65) Prior Publication Data

US 2015/0158212 A1    Jun. 11, 2015

Related U.S. Application Data

(63) Continuation of application No. PCT/DE2013/000376, filed on Jul. 11, 2013.

(30) Foreign Application Priority Data

Aug. 27, 2012   (DE) .................. 10 2012 016 934

(51) Int. Cl.
  *B29C 43/20*  (2006.01)
  *B29C 37/00*  (2006.01)
  (Continued)

(52) U.S. Cl.
  CPC ........ *B29C 43/203* (2013.01); *B29C 37/0075* (2013.01); *B29C 70/46* (2013.01); *B29L 2031/774* (2013.01); *F16F 1/368* (2013.01)

(58) Field of Classification Search
  CPC ..... F16F 1/22; F16F 1/368; F16F 7/00; B32B 17/02; B32B 7/02
  (Continued)

(56) References Cited

U.S. PATENT DOCUMENTS

| 3,900,357 A |   | 8/1975 | Huchette et al. |
| 3,968,958 A | * | 7/1976 | Huchette ............... B29C 70/345 |
| | | | 267/149 |

(Continued)

FOREIGN PATENT DOCUMENTS

| DE | 1231967 | 1/1967 |
| DE | 35 28 183 A1 | 3/1986 |

(Continued)

OTHER PUBLICATIONS

Siebdreth et al.; Forming fibre reinforced plastic components from prepregs; DE19617699.*

(Continued)

*Primary Examiner* — Michael N Orlando
*Assistant Examiner* — Christian Roldan
(74) *Attorney, Agent, or Firm* — Woodard, Emhardt, Moriarty, McNett & Henry LLP

(57) ABSTRACT

The invention relates to a method for producing leaf springs from a fiber composite material, for which a plurality of layers of fibers soaked or impregnated with synthetic resin in order to build up a not yet hardened unfinished leaf. The unfinished leaf spring is arranged in a compression mold, and the unfinished leaf spring is hardened under the influence of a predetermined pressing force and temperature curve over time to give a finished leaf spring. In order to reduce production costs, according to the invention a plurality of unfinished leaf springs are arranged vertically one (Continued)

above the other in the compression mold and the unfinished leaf springs are simultaneously hardened in the compression mold to give leaf springs.

2 Claims, 3 Drawing Sheets

(51) Int. Cl.
 *B29C 70/46* (2006.01)
 *B29L 31/00* (2006.01)
 *F16F 1/368* (2006.01)

(58) Field of Classification Search
 USPC ............ 267/141, 148, 47; 428/213; 442/171
 See application file for complete search history.

(56) References Cited

U.S. PATENT DOCUMENTS

| | | | |
|---|---|---|---|
| 4,196,950 A * | 4/1980 | Churchill | B32B 27/06 |
| | | | 156/79 |
| 4,201,826 A * | 5/1980 | Nylander | C08L 67/06 |
| | | | 428/430 |
| 4,468,014 A | 8/1984 | Strong | |
| 4,556,204 A | 12/1985 | Pflederer | |
| 4,596,835 A * | 6/1986 | Werner | C08G 18/707 |
| | | | 521/103 |
| 4,659,071 A | 4/1987 | Woltron | |
| 4,683,018 A * | 7/1987 | Sutcliffe | B29C 33/68 |
| | | | 156/196 |
| 4,786,033 A | 11/1988 | Kofler | |
| 4,894,108 A | 1/1990 | Richard et al. | |
| 6,461,455 B1 | 10/2002 | Meatto et al. | |
| 6,619,637 B1 | 9/2003 | Juriga | |
| 7,712,754 B2 | 5/2010 | Penzotti | |
| 8,852,709 B2 | 10/2014 | Lozano Garcia et al. | |
| 9,194,451 B2 | 11/2015 | Voigt et al. | |
| 2009/0256296 A1 * | 10/2009 | Aulich | B29C 66/435 |
| | | | 267/148 |
| 2012/0034833 A1 * | 2/2012 | Schaube | B29C 70/086 |
| | | | 442/172 |
| 2012/0313307 A1 * | 12/2012 | Cartwright | C08J 5/042 |
| | | | 267/141 |
| 2012/0328858 A1 * | 12/2012 | Fujiwara | C08G 59/4021 |
| | | | 428/213 |

FOREIGN PATENT DOCUMENTS

| | | |
|---|---|---|
| DE | 40 26 045 A1 | 2/1992 |
| DE | 40 26 046 A1 | 2/1992 |
| DE | 102005034499 A1 | 2/2007 |
| DE | 10 2006 052 137 A1 | 5/2008 |
| DE | 10 2010 050 065 A1 | 5/2012 |
| EP | 0 084 101 A2 | 7/1983 |
| EP | 0 106 249 A1 | 4/1984 |
| EP | 0215365 | 3/1987 |
| EP | 0956981 | 11/1999 |
| EP | 2 363 271 A1 | 9/2011 |
| GB | 106571 | 6/1917 |
| JP | 56141435 | 11/1981 |
| JP | 57 107 817 A1 | 7/1982 |
| JP | 57124141 | 8/1982 |
| JP | 57179442 A | 11/1982 |
| JP | 58077941 | 5/1983 |
| JP | 58077942 | 5/1983 |
| JP | 59006443 | 1/1984 |
| JP | 1278634 | 12/1986 |
| WO | WO 2008/055458 A1 | 5/2008 |

OTHER PUBLICATIONS

PCT/DE2013/000376 International Search Report dated Nov. 13, 2013.

* cited by examiner

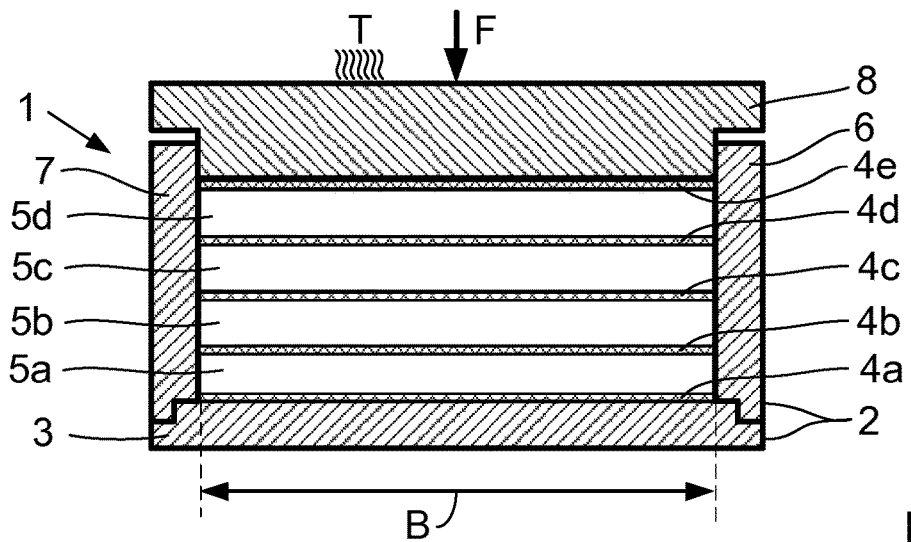
Fig.1
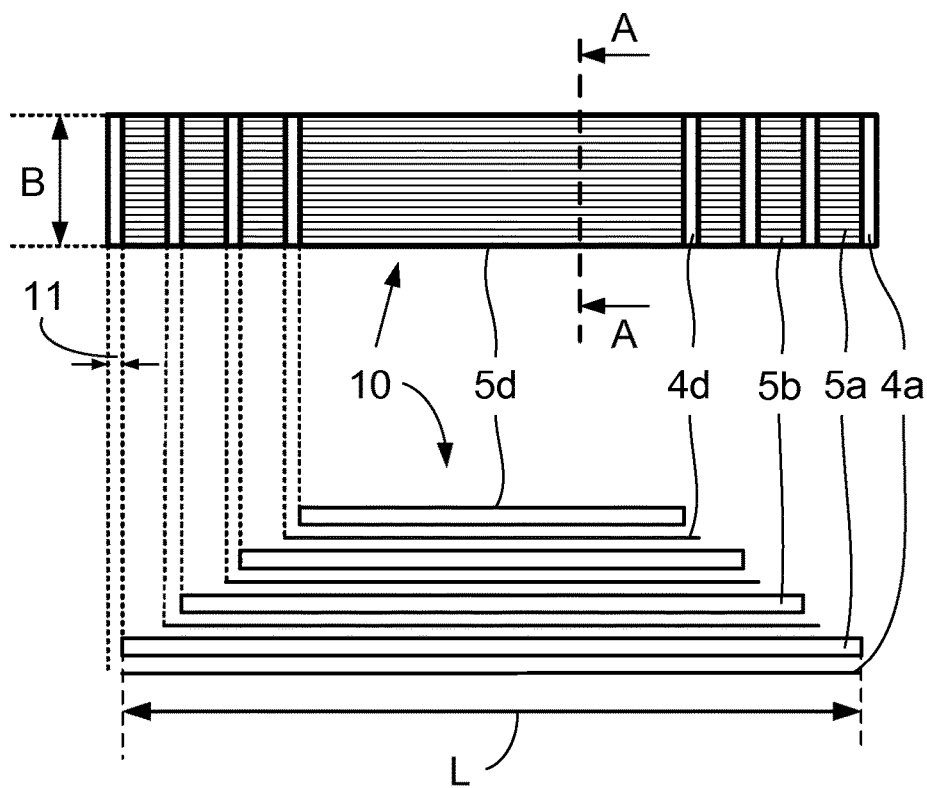
Fig.2
Fig.3

US 10,046,485 B2

METHOD FOR SIMULTANEOUS PRODUCTION OF A PLURALITY OF LEAF SPRINGS FROM A FIBER COMPOSITE MATERIAL

CROSS REFERENCE TO RELATED APPLICATIONS

This application is a continuation of PCT/DE2013/000376 filed Jul. 11, 2013 which claims the benefit of DE 10 2012 016 934.5 filed Aug. 27, 2012, which are hereby incorporated herewith.

BACKGROUND

The present invention relates to a method for manufacturing leaf springs from a fiber-composite material.

Leaf springs made from a fiber-composite material are increasingly replacing conventional leaf springs made from steel, since the former are, above all, lighter than the latter. When the former are used in a vehicle, said vehicle is altogether lighter, such that less energy has to be invested for driving said vehicle. This not only results in lower fuel consumption, but also in correspondingly reduced emissions of pollutants of the vehicle engine. However, leaf springs from a fiber-composite material have until now still been more expensive in their manufacture than comparable leaf springs from steel, such that the latter presently have a certain competitive advantage, particularly in the case of lower-value vehicles. The manufacturing costs for a fiber-composite leaf spring in comparison with those of a steel leaf spring which in its properties is comparable with the former are higher above all because fiber-composite material leaf springs presently used in the construction of vehicles are manufactured in a comparatively labor-intensive method. In this method, initially a leaf-spring blank is constructed by layering individual layers of prepregs on top of one another. Such prepreg layers are composed of a plurality of individual fiber strands, fiber cross-laid structures and/or fibrous woven fabrics, which are embedded in a yet non-cured duroplastic resin. The fibers may be configured as glass fibers, carbon fibers, or aramid fibers, for example. Subsequently, the initially still flexible leaf-spring blank is laid up in a compressive mold and cured at a predetermined temperature and pressure profile.

Such a method is disclosed, for example, in DE 10 2010 050 065 A1. The method of production which is described relates to the use of glass reinforced plastic materials for leaf springs. More specifically, fibers of different lengths are arranged one above the other and moistened with a synthetic resin. This method is indeed considered as being advantageous with respect to the properties of a fiber-composite material leaf spring which is manufacturable in this manner, but it does not have the effect of any significant reduction of the manufacturing costs of leaf springs from fiber-composite materials.

SUMMARY

The present invention is thus based on the object of providing a method for manufacturing a leaf spring from a fiber-composite material, by way of which a considerable reduction of manufacturing costs is achievable. However, the properties of a fiber-composite material leaf spring which has been manufactured in this way are not to be inferior to those of a leaf spring from a fiber-composite material which has been manufactured in a conventional manner.

The achievement of this object is derived from the features disclosed herein and recited by the claims.

Accordingly, the invention is based on a method for manufacturing leaf springs from a fiber-composite material, in which for the construction of a yet non-cured leaf-spring blank a plurality of layers of fibers which are soaked or impregnated with artificial resin are laid on top of one another, in which this leaf-spring blank is arranged in a compressive mold, and in which, in order to produce a finished leaf spring, the leaf-spring blank is cured under the influence of a predetermined temporal compression and temperature profile. For reducing the manufacturing costs it is provided according to the invention that a plurality of leaf-spring blanks are vertically arranged on top of one another in the compressive mold, and in that, in order to produce leaf springs, these leaf-spring blanks are subsequently simultaneously cured in the compressive mold.

It is readily understandable that a very sizeable cost reduction takes place in that a plurality of leaf springs from a fiber-composite material are simultaneously cured in only one compressive mold. In the case of a predefined number of pieces per time unit, this number of leaf springs can be produced in this way while using a lower number of compressive molds. In the case of a comparatively large number of already existing compressive molds, a very much larger number of leaf springs can be produced in a predefined period of time.

The investment expenditure for exploiting the method according to the invention is comparatively small, since in the case of an existing compressive mold only the shape-imparting components thereof have to be adapted to not only one leaf spring but a plurality of such leaf springs per compressive mold now being cured therein under positive pressure and increased temperature. All other modifications on the compressive mold which are required for exploiting the method according to the invention relate to only readily modifiable process parameters, such as the temporal profile of the pressure increase, the time period for maintaining the pressure, and, if applicable, the temporal profile of releasing the pressure acting on the leaf springs, for example. The temporal profile of the temperature of the leaf-spring blanks in the compressive mold likewise is to be adapted to the number of leaf-spring blanks of a stack of leaf-spring blanks in the compressive mold with respect to the summary curing behavior of said stack. These process parameters also depend on the selected raw materials for manufacturing the leaf springs, and on the size of the spring-leaf blanks which are arranged in a stack.

The geometric shape of the leaf-spring blanks which are arranged in one stack of leaf-spring blanks may be identical or variable. Only the raw materials used have to be identical in order to obtain good production results.

According to an advantageous refinement of the method it may be provided that prior to being laid up in the compressive mold, each of the leaf-spring blanks on the upper side and lower side thereof is covered with a release film. In the case of the lower leaf-spring blank in a stack, this may take place, for example, in that the former, with its bottom-most resin-soaked fiber layer, or with its bottom-most prepreg, respectively, is laid directly onto such a release film, wherein preferably this release film displays at least the same length and width as the leaf-spring blank. After completing the layering of the resin-soaked fiber layers or prepregs on top of one another in order to form the first leaf-spring blank, a further release film is laid onto the top of said first leaf-spring blank. A second leaf-spring blank of the stack of leaf-spring blanks to be constructed, which likewise on its lower side and/or upper side displays a release film as described, may then be laid onto said lower, first leaf-spring blank. The leaf-spring blanks are thus manufactured outside the compressive mold and then laid up one after another and on top of one another in the compressive mold.

According to an alternative variant thereto, it may be provided that prior to laying up the first, lower leaf-spring blank, a release film is laid on the base of the compressive mold, and in that on the upper side of said bottom-most leaf-spring blank and of each further leaf-spring blank which is laid up in the compressive mold a further release film is laid up.

Preferably, leaf-spring blanks having the same axial length and width are manufactured in the only one compressive mold. However, it is also possible that leaf-spring blanks having a variable axial length are laid vertically on top of one another, that in each case one release film is laid between the leaf-spring blanks, that the longest leaf-spring blank is laid first in the compressive mold, that the next shorter leaf-spring blank follows thereafter, and finally the shortest leaf-spring blank as the last is arranged at the very top of the stack of leaf-spring blanks in the compressive mold. The shape-imparting components of the compressive mold here are adapted to the lengths of the various leaf-spring blanks.

A further refinement of the method according to the invention provides that the leaf springs, after curing thereof, are removed from the compressive mold and are mechanically separated from one another. Subsequently, cured leaf springs which are largely geometrically identical and which, if applicable, finally only have to be cleaned of resin residue, are available.

However, it may also be provided that after separating the cured leaf springs from one another, the release films are torn away therefrom, since said release films have fulfilled their task of preventing adjacent leaf springs from adhering to one another.

According to a method step which is an alternative thereto, it may also be provided that after separating the cured leaf springs from one another, the release films remain on the cured leaf springs as protective films for protecting the surfaces thereof. Such a procedure is particularly advantageous if a release film which is composed of PET (polyethylene terephthalate), ABS (acrylonitrile-butadiene-styrene), or aluminum is used.

According to another variant of the method, it may be provided that the cured leaf springs are removed from the compressive mold and are held together as a stack under the influence of a modest adhesive force caused by the release films or by cured resin residue which is laterally located. This may be advantageous if the individual leaf springs merely form individual part-leaf springs which are to be installed together as a complete leaf-spring package in a vehicle, as is the case with a steel leaf spring.

It may finally be provided that at least one release film displays at least one window-like cutout and is laid in such a manner onto the upper side of a leaf-spring blank that the next leaf-spring blank to be subsequently laid onto this release film comes into direct material contact with the lower leaf-spring blank, and in that, on account of the material of the leaf-spring blanks, adhesive bonding of the leaf springs which are vertically directly adjacent takes place within this window-like cutout during curing of the leaf-spring blanks.

DESCRIPTION OF THE DRAWINGS

In the following, the invention is further explained by means of exemplary embodiments and with the aid of a drawing which is appended to the description. In the drawing:

FIG. 1 shows a schematic cross section through a compressive mold in which four leaf-spring blanks, which are separated from one another by release films, are arranged, FIG. 2 shows a plan view onto a stack having four leaf-spring blanks of various lengths, which are separated from one another by release films, FIG. 3 shows a side view of four leaf-spring blanks and assigned release films in the manner in which they are assembled to form the stack according to FIG. 2.

DESCRIPTION OF THE SELECTED EMBODIMENTS

Figure 4:
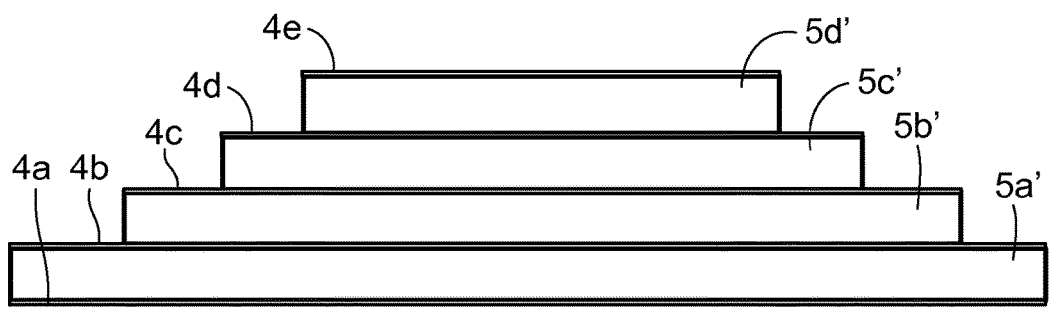
FIG. 4 shows a side view of a stack of four cured leaf springs having various axial lengths, which are arranged on top of one another.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The compressive mold 1 which is schematically illustrated in cross section in FIG. 1 is substantially composed of a molding box 2 having a base 3, two removable side walls 6, 7, and a cover 8. A first release film 4a, on which a first leaf-spring blank 5a has been deposited or constructed, has been arranged on the base 3 of the compressive mold 1. Thereabove, a second, third, fourth, and fifth release film 4b, 4c, 4d, 4e have been arranged in an alternating manner with in each case a second, third, and fourth leaf-spring blank 5b, 5c, 5d. The cross section through the stack 10 of the leaf-spring blanks 5a, 5b, 5c, 5d, and the release films 4b, 4c, 4d, 4e, corresponds to the section line A-A of FIG. 2.

The four leaf-spring blanks 5a, 5b, 5c, 5d, are composed of a fiber-composite material having a duroplastic artificial resin which cures at a predetermined temperature. Fibers made from glass, carbon, aramid, or similar materials, may be employed as a fiber material. The leaf-spring blanks 5a, 5b, 5c, 5d, largely fill the interior space of the compressive mold 1, and the release films 4a, 4b, 4c, 4d, 4e, extend across the entire width B of the leaf-spring blanks 5a, 5b, 5c, 5d. The cover 8 of the compressive mold 1 bears from the very top onto this stack 10 composed of four leaf-spring blanks 5a, 5b, 5c, 5d, and five release films 4a, 4b, 4c, 4d, 4e which cover 8 exerts a preselected compressive pressure F on the stack 10. In order to be able to ensure a predetermined proportion of resin in the cured leaf springs 5a', 5b', 5c', 5d', excessive artificial resin preferably may be conveyed out of the compressive mold 1 in the direction toward the axial ends of the leaf-spring blanks 5a, 5b, 5c, 5d. A temperature T, which is selected in such a manner that the leaf-spring blanks 5a, 5b, 5c, 5d, can be cured according to their material properties to form finished leaf springs 5a', 5b', 5c', 5d', acts in the stack 10 of the four leaf-spring blanks 5a, 5b, 5c, 5d, and five release films 4a, 4b, 4c, 4d, 4e.

Accordingly a plurality of leaf-spring blanks 5a, 5b, 5c, 5d, are compressed and cured in only one compressive mold 1, while until now, in the conventional manner, always only one leaf spring is arranged in a generic compressive mold in each compression and curing operation. As has been shown by investigations, the prevailing view among manufacturers of leaf springs made from fiber-composite material that in each case only one leaf spring of adequate quality can be compressed and cured in a compressive mold has proven to be a technical prejudice. On account of simultaneously compressing and curing a plurality of leaf-spring blanks 5a, 5b, 5c, 5d, which are arranged on top of one another in a stack 10, and at a temperature T which is adequate for curing the duroplastic artificial resin which is used in the leaf-spring blanks 5a, 5b, 5c, 5d, production time can be saved and the number of compressive molds to be made available in a factory for mass production can be considerably reduced, thus significantly reducing the manufacturing costs for such leaf springs.

FIG. 2, in a schematic plan view, shows an exemplary embodiment of a stack 10 of four leaf-spring blanks 5a, 5b, 5c, 5d, of variable axis lengths, having a variable length L and an identical width B, which are separated from one another by four release films 4a, 4b, 4c, 4d. The four release films 4a, 4b, 4c, 4d, identifiably are also of variable axial lengths, wherein, however, each of these four release films 4a, 4b, 4c, 4d, is longer than the leaf-spring blank 5a, 5b, 5c, 5d, deposited thereon. On account of laying on top of one another variably long and/or wide leaf-spring blanks 5a, 5b, 5c, 5d, it is possible to manufacture leaf springs 5a', 5b', 5c', 5d', which are of variable lengths and/or widths in only one compressive mold 1.

FIG. 3 shows this stack 10 in a schematic side view, in which the leaf-spring blanks 5a, 5b, 5c, 5d, and the release films 4a, 4b, 4c, 4d, for improved differentiation, are illustrated so as to be raised from one another, or as having a vertical spacing from one another, respectively. FIG. 3 thus also visualizes how the leaf-spring blanks 5a, 5b, 5c, 5d, are deposited on the respectively assigned release films 4a, 4b, 4c, 4d, namely vertically on top of one another, in order to form the stack 10. An axial projection 11 of the bottom-most release film 4a can be dispensed with or can be cut off. The projection 11 may also be folded up so as to be on the side walls 6, 7, of the compressive mold 1, on account of which molding of the leaf springs 5a, 5b, 5c, 5d, is facilitated.

FIG. 4 shows a stack composed of four cured spring leafs 5a', 5b', 5c', 5d', which have just been removed from the compressive mold 1. These cured leaf springs 5a', 5b', 5c', 5d', are covered by five release films 4a, 4b, 4c, 4d, 4e, which are exactly as long as the respective leaf spring 5a', 5b', 5c', 5d', such that these leaf springs 5a', 5b', 5c', 5d', on their upper side and on their lower side are covered by a release film 4a, 4b, 4c, 4d, 4e. On account of a modest adhesive effect of the release films 4a, 4b, 4c, 4d, 4e, and/or because of cured excessive synthetic resin which has laterally remained, these four leaf springs 5a', 5b', 5c', 5d' are still bonded and thus can be supplied as a stack to a further final processing station in a production line. However, it is also possible for the leaf springs 5a', 5b', 5c', 5d', of this stack to be interconnected by mechanical aids, in order to achieve a graduated leaf-spring package from fiber-composite material, which is composed of the four individual leaf springs 5a', 5b', 5c', and 5d'. Such a mechanical aid may be a metallic clamp (not illustrated) which encompasses all individual leaf springs 5a', 5b', 5c', 5d', preferably in a centrically fixed and cushioned manner.

Figure 5:
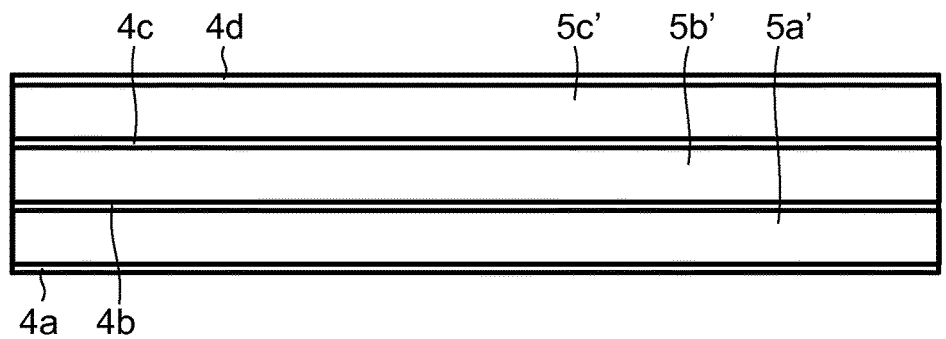
FIG. 5 shows a side view as in FIG. 4, but with four cured leaf springs of identical length.
Figure 6:
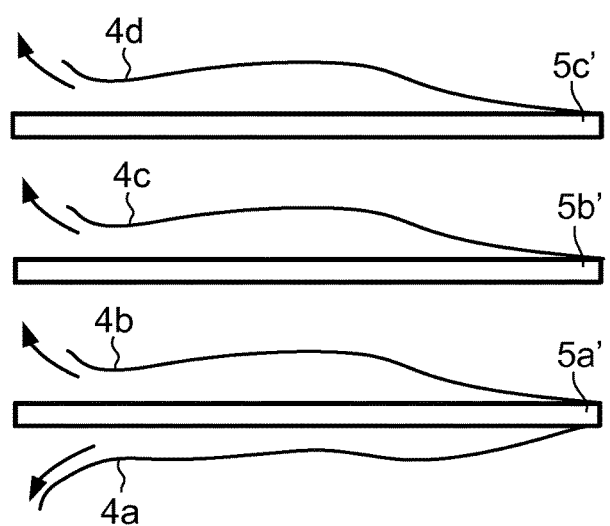
FIG. 6 shows a side view of cured leaf springs from which the release films are being torn off in a method step.

In the stack of three cured leaf springs 5a', 5b', 5c', 5d', shown in FIG. 5 it is clearly identifiable that said leaf springs display in each case the identical axial length L. In order to manufacture finished leaf springs therefrom, they are initially separated from one another and subsequently the release films 4a, 4b, 4c, 4d, are torn off therefrom, as illustrated in FIG. 6. There remain three leaf springs 5a', 5b', 5c' which are configured in a largely identical manner and are free from release film and which, in a manner saving manufacturing costs, have been simultaneously compressed and cured in only one compressive mold 1.

However, the release films 4a, 4b, 4c, 4d, do not unconditionally have to be removed from the cured leaf springs 5a', 5b', 5c'. Rather, they may remain as a protective film on the latter, in order to be able to absorb minor damage to the material of the finished leaf springs 5a', 5b', 5c', which may occur during assembly or during operation of the latter.

Figure 8:
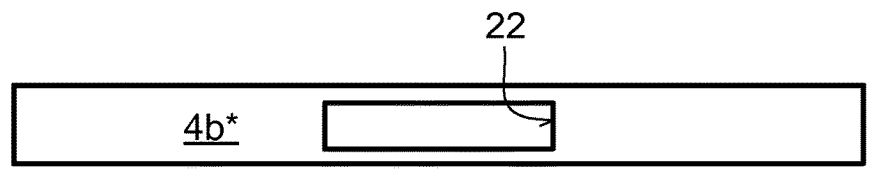
FIG. 8 shows a plan view onto a release film having a centric, window-like cutout which enables adhesive bonding of two vertically adjacent leaf-spring blanks in the region of this cutout.

FIG. 8, according to another variant, shows a release film 4b* which, in a centric manner, displays a rectangular window-like cutout 22. In the region of said cutout 22 this release film 4b*, in an arrangement between two vertically adjacent leaf-spring blanks 5a'/5b', or 5b'/5c', is not capable of preventing adhesive bonding of these adjacent leaf-spring blanks 5a'/5b', 5b'/5c', when the latter set and cure in the compressive mold 1. In the plan view, the cutout 22 may also be shaped so as to be round or oval, or may be formed from a plurality of small material clearances in the release film 4b*.

Figure 7:
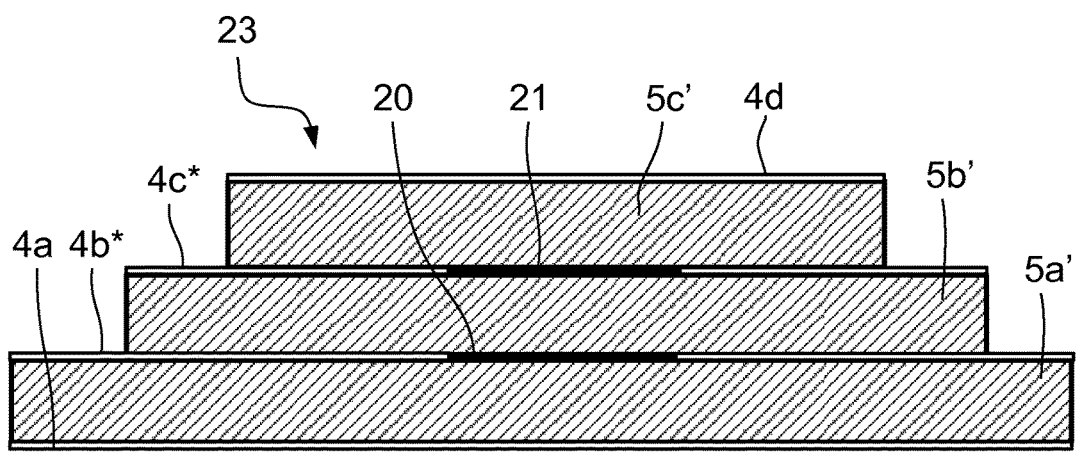
FIG. 7 shows a longitudinal section through a stack of cured leaf springs, in which in each case two adjacent leaf springs are interconnected in each case in one adhesive region.

FIG. 7 shows a schematic longitudinal section through a stack composed of three cured leaf springs 5a', 5b', 5'c, and four release films 4a, 4b*, 4c*, 4d, in which the two release films 4b* and 4c* display the described cutout 22. At the location of these cutouts 22, the vertically directly adjacent cured leaf springs 5a'/5b', 5b'/5c', are fixedly interconnected in a first and a second adhesive region 21, 22. The narrated connection of the three leaf springs 5a', 5b', 5c', does not have to be able to transmit large forces. The cohesion is at least as great so that the leaf-spring package 23 composed of the individual leaf springs 5a', 5b', 5c', is maintained during downstream final processing steps and during shipping to the site of installation in the vehicle. Therefore, it is not considered to be disadvantageous if the leaf-spring package composed of three leaf springs 5a', 5b', 5c', separates into individual leaf springs after having been installed in a vehicle.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method for manufacturing leaf springs from a fiber-composite material, in which for the construction of a yet non-cured leaf-spring blank a plurality of layers of fibers which are soaked or impregnated with artificial resin are laid on top of one another, in which this leaf-spring blank is arranged in a compressive mold, and in which, in order to produce a finished leaf spring, the leaf-spring blank is cured under the influence of a predetermined temporal compression and temperature profile, characterized in that a plurality of leaf-spring blanks are vertically arranged on top of one another in the compressive mold, and in order to produce leaf springs, these leaf-spring blanks are simultaneously cured in the compressive mold, wherein prior to being laid up in the compressive mold, each of the leaf-spring blanks on the upper side and lower side thereof is covered with a release film, and wherein at least one release film is provided with at least one window-like cutout and is laid in such a manner onto the upper side of a leaf-spring blank that the next leaf-spring blank to be laid onto this release film in the region of the cutout comes into direct material contact with the lower leaf-spring blank and in that, on account of the material of the leaf-spring blanks, adhesive bonding of the leaf springs which are vertically directly adjacent takes place within this window-like cutout during curing of the leaf-spring blanks.

2. The method as claimed in claim 1, characterized in that such release films are composed of polyethylene terephthalate, acrylonitrile-butadiene-styrene, or aluminum.

* * * * *